(12) United States Patent  
Martin et al.

(10) Patent No.: US 8,264,522 B2  
(45) Date of Patent: Sep. 11, 2012

(54) VIDEOTELEPHONE TERMINAL WITH INTUITIVE ADJUSTMENTS

(75) Inventors: Alexis Martin, Grenoble (FR); Jean-Jacques Damlamian, Clamart (FR); Roland Airiau, Sassenage (FR)

(73) Assignee: France Telecom, Paris (FR)

( * ) Notice: Subject to any disclaimer, the term of this patent is extended or adjusted under 35 U.S.C. 154(b) by 1414 days.

(21) Appl. No.: 11/794,695

(22) PCT Filed: Dec. 20, 2005

(86) PCT No.: PCT/FR2005/003206  
§ 371 (c)(1),  
(2), (4) Date: Aug. 28, 2007

(87) PCT Pub. No.: WO2006/075063  
PCT Pub. Date: Jul. 20, 2006

(65) Prior Publication Data  
US 2008/0246830 A1    Oct. 9, 2008

(30) Foreign Application Priority Data  
Jan. 7, 2005   (FR) ..................... 05 00180

(51) Int. Cl.  
*H04N 7/14* (2006.01)

(52) U.S. Cl. .............. 348/14.16; 345/619; 348/14.14; 348/14.15; 455/550.1

(58) Field of Classification Search .... 348/14.01–14.16, 348/143–161; 370/259–271, 351–356; 455/403–426.2, 456.1–466, 550.1–560; 709/201–207, 709/217–248  
See application file for complete search history.

(56) References Cited

U.S. PATENT DOCUMENTS

| | | | |
|---|---|---|---|
| 6,697,103 B1 * | 2/2004 | Fernandez et al. | 348/143 |
| 7,099,288 B1 * | 8/2006 | Parker et al. | 370/259 |
| 7,221,520 B2 * | 5/2007 | Dowling et al. | 359/698 |
| 7,498,951 B2 * | 3/2009 | Wardimon | 340/691.3 |
| 7,933,556 B2 * | 4/2011 | Tischler et al. | 455/66.1 |
| 2003/0016804 A1 * | 1/2003 | Sheha et al. | 379/201.06 |
| 2006/0099940 A1 * | 5/2006 | Pfleging et al. | 455/419 |
| 2006/0279542 A1 * | 12/2006 | Flack et al. | 345/158 |

FOREIGN PATENT DOCUMENTS

| | | |
|---|---|---|
| EP | 1 304 853 A2 | 4/2003 |
| EP | 1 377 040 A1 | 1/2004 |

* cited by examiner

*Primary Examiner* — Hemant Patel  
(74) *Attorney, Agent, or Firm* — Drinker Biddle & Reath LLP

(57) ABSTRACT

Intuitive adjustment of framing on a terminal is achieved by a remote party using a mobile terminal during a videotelephone call. The terminal includes a camera, framing means, video encoding means and communication and multiplexing means. The terminal includes motion sensors, formatting means, and communication and multiplexing means. In response to its own movement, the terminal produces framing data from movement information coming from the movement sensors and sends said framing data to the terminal. The framing means extract image portions from images captured by the camera in response to framing information corresponding to the framing data.

11 Claims, 3 Drawing Sheets

VIDEOTELEPHONE TERMINAL WITH INTUITIVE ADJUSTMENTS

CROSS-REFERENCE TO RELATED APPLICATIONS

This application is the U.S. national phase of the International Patent Application No. PCT/FR2005/003206 filed Dec. 20, 2005, which claims the benefit of French Application No. 05 00180 filed Jan. 7, 2005, the entire content of which is incorporated herein by reference.

BACKGROUND OF THE INVENTION

The invention relates to mobile telephones with high data rates able to capture and display images for videotelephone calls. Such telephones are also called videotelephone terminals. The invention relates more particularly to adjusting the image capture means.

In the field of telecommunications, the introduction of high bit rates has made videotelephone services available to the consumer. More particularly, third generation mobile telephone networks, such as UMTS (Universal Mobile Telecommunication System) networks, for example, enable mobile telephones or terminals to provide videotelephone applications.

Videotelephones enable two people to see each other while communicating at a distance. To this end, the terminal of each person has a display screen and a camera. Mobile terminals have a small screen with low definition and it is important to have good foreground framing if the other party's face is to be seen clearly.

One drawback arises from the fact that a party A communicating with a party B sees only what is sent by the camera of the party A. Since the party B has no control of framing, it is the party A who must take care of controlling what is shot by his or her own camera. This control over what is being shot by the camera can be assisted by displaying a thumbnail in a corner of the screen. The parties must then ensure that their own images remain centered in the thumbnail.

That kind of framing system is somewhat impractical, for numerous reasons. It reduces the usable area of the display screen of the terminal, which is small enough in the first place. The parties must pay careful attention to framing their own images. The framing motions do not come naturally, as the thumbnail shows an image shot with left to right inversion.

Using a remote control camera for fixed videoconference systems is known in the art. Thus a party A can adjust the camera of a party B and vice-versa. Each user has a remote control for sending zoom and tracking commands. Because mobile terminal cameras are generally not mobile and such adjustments would require using the keys of the keypad of the terminal during the call, such a system cannot be used in a mobile terminal. The keys of a mobile terminal are small and it would be somewhat impractical to use them whilst holding the terminal so that it faces in a given direction to achieve the necessary framing.

EP-A-1 304 853 describes a mobile device, such as a mobile telephone, including a still camera and motion sensors. The camera captures a plurality of images of an object and those images are then combined. Synchronized motion information supplied by the motion sensors is used to realign the images to be combined. This concept does not employ two remotely sited videotelephone terminals.

SUMMARY OF THE INVENTION

The invention proposes to solve the above framing problems. Each mobile terminal includes a camera that can have a resolution greater than the resolution of the image transmitted. The image transmitted is framed with the assistance of framing information coming from the remote party. Each mobile terminal includes motion sensors for capturing terminal motion information that is converted into framing commands to be sent to the other terminal.

A first aspect of the invention proposes a mobile videotelephone terminal including communication means, motion sensors and formatting means. The communication means enable communication with another videotelephone terminal via a radio communication network. The motion sensors produce information representing motion of the terminal. The formatting means convert the motion information into outgoing framing data sent to the other terminal. The communication means insert the outgoing framing data into data to be sent to the other terminal over the radio communication network.

The formatting means include filtering and command generation means for comparing the motion information to a minimum motion threshold and a maximum motion threshold. The outgoing framing data is produced in response to detecting motion between the minimum motion threshold and the maximum motion threshold.

A second aspect of the invention proposes a mobile videotelephone terminal including communication means, a video camera, framing means and video encoding means. The communication means enable communication with another videotelephone terminal via a radio communication network. The camera captures images having a first size. The framing means extract an image portion from an image captured by the camera. The framing means select the image portion as a function of remote framing information coming from the other terminal. Said image portion has a second size smaller than the first size. The video encoding means convert a stream of image portions coming from the framing means into outgoing video data. The communication means extract the remote framing information from data from the other terminal that they receive from the radio communication network.

Thus intuitive displacement of a terminal conforming to the first aspect of the invention enables a party A to reframe an image shot by a terminal conforming to the second aspect of the invention of another party B. Both aspects of the invention are preferably implemented in the same terminal.

A third aspect of the invention relates to a method used during a videotelephone call to reframe an image captured by a video camera of a first mobile videotelephone terminal, this reframing being effected by a second mobile videotelephone terminal having a screen and motion sensors. The method includes a step of producing framing data in response to motion of the second mobile terminal based on motion information produced by the motion sensors and a step of sending said framing data to the first mobile terminal.

In response to framing information received by the first mobile terminal and corresponding to framing data sent by the second terminal, the first terminal extracts image portions corresponding to said framing information from images captured by its camera and produces a video clip representing a succession of image portions.

A final aspect of the invention relates to a signal transporting a stream of videotelephone frames between a first mobile terminal and a second mobile terminal. A frame sent by the first terminal includes audio data, video data and framing data. The framing data indicates the position and/or movement of an image portion captured by a camera of the second terminal that corresponds to an image to be sent from the second terminal to the first terminal.

DESCRIPTION OF PREFERRED EMBODIMENTS

Figure 1:
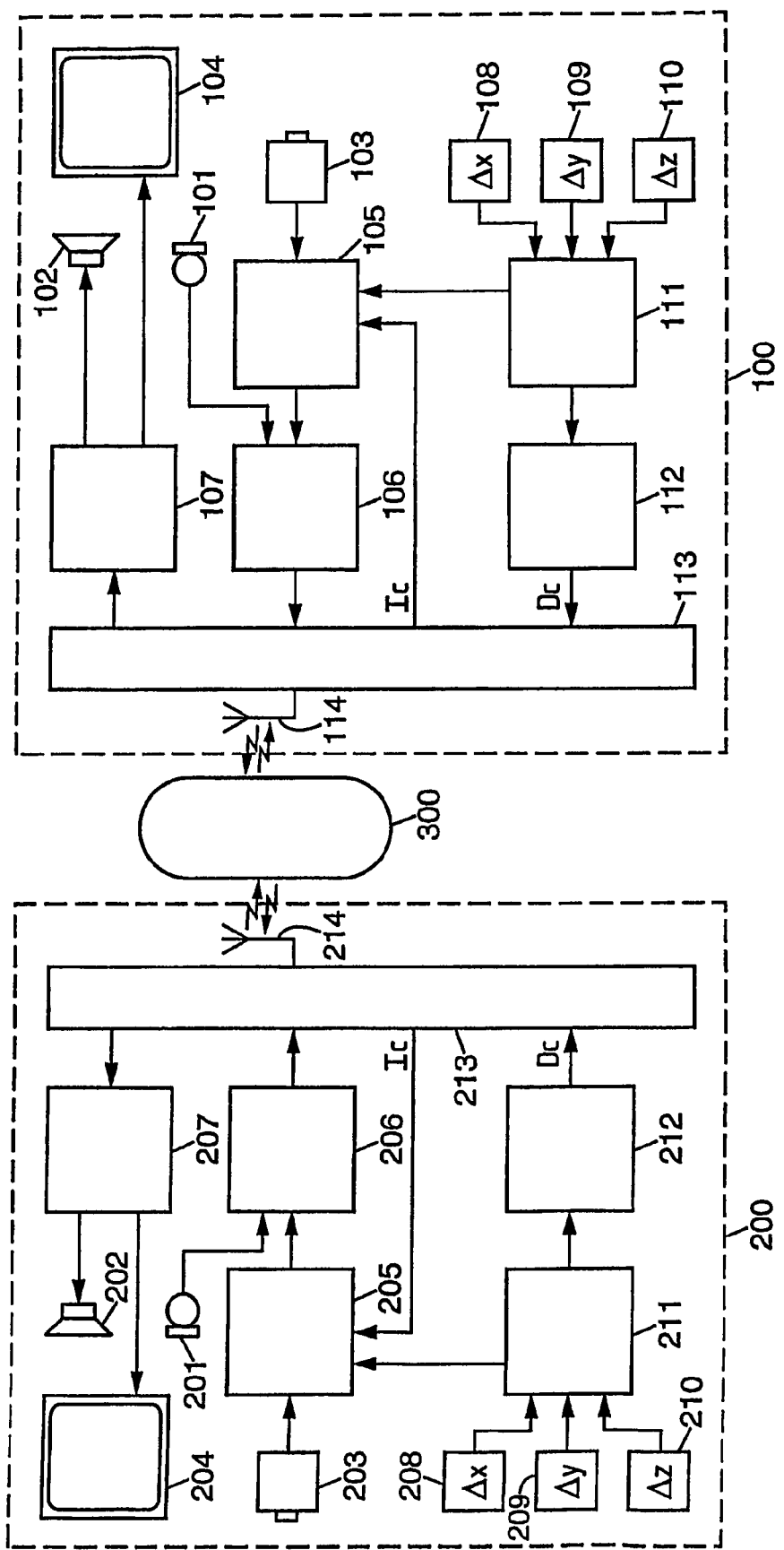
FIG. 1 a functional block diagram representing two mobile communication terminals of the invention.

FIG. 1 represents two mobile terminals 100 and 200 communicating via a mobile telephone or radio communication network 300, for example a third generation radio communication network conforming to the UMTS standard. A third generation mobile telephone network is a high bit rate radio communication network for exchange of audio, video or other data between a mobile terminal and the network.

The present invention relates to managing framing during a videotelephone call between two terminals. Only the framing means are described in detail. Other components of the terminals and the network are well known to the person skilled in the art.

To simplify the description, the two terminals 100 and 200 are identical. Similar references 1xx and 2xx are used for similar elements, the hundreds digit distinguishing the terminals from each other. Thus what is described with reference to elements of the terminal 100 applies to the terminal 200, and vice-versa.

The first terminal 100, which is of the mobile telephone type, includes:
- a microphone 101 for capturing sound;
- a loudspeaker 102 for reproducing sound;
- a video camera 103 for capturing images;
- a display screen 104 for reproducing images;
- framing means 105 connected to the camera 103 to extract from an image captured by the camera 103 an image portion selected as a function of framing information $I_c$ coming from a remote other terminal;
- audio and video encoding means 106 connected to the microphone 101 and the framing means 105 to convert sound captured by the microphone 101 into outgoing audio data and a stream of image portions coming from the framing means 105 into outgoing video data consisting of a video clip compressed by an image compression algorithm, for example;
- audio and video decoding means 107 connected to the loudspeaker 102 and the display screen 104 to convert incoming audio data into a signal for driving the loudspeaker 102 and incoming video data into a picture signal to be reproduced on the display screen 104;
- motion sensors 108 to 110 for producing terminal motion information;
- motion information filtering means 111 connected to the motion sensors 108 to 110;
- command generation means 112 connected to the filtering means 111 to convert filtered motion information into outgoing framing data Dc sent to another terminal;
- multiplexing and communication means 113 connected to the encoding means 106, command generation means 112, decoding means 107 and framing means 105 group into data packets audio, video and framing data $D_C$ to be sent to the network and receive data packets and separate them into audio data, video data and framing information $I_C$; and
- an antenna 114 connected to the multiplexing and communication means 113 to exchange with the network 300 radio signals representing data packets sent and received by the terminal 100.

To maximize the integration of its components, a mobile terminal conventionally includes a central processor, a signal processor and, where appropriate, an image processor. These three processors are microprogrammed to process all data and all signals in digital form. Accordingly, the means 105-107 and 111-112 represented functionally in FIG. 1 can in practice be produced by appropriately programming these three processors. Analog/digital converters and digital/analog converters connect the processors to the various elements 101-104 and 108-110. The multiplexing and communication means 113 are also implemented by the processors of the terminal and additionally include a radio interface connected to the antenna 114.

During a videotelephone call, the audio and video decoding means 107 receive audio and video data from the remote terminal 200 and convert it into control signals for the loudspeaker 102 and the screen 104 in order to reproduce to a user A of the terminal 100 the sound captured by the microphone 202 and the image captured by the camera 203 of the terminal 200 of the other party B. The screen 104 is of the LCD (liquid crystal display) or OLED (organic light-emitting diode) type and of small size, for example with a diagonal length less than 2 inches. The resolution of the screen 104 is less than 200 pixels in each direction, for example. The user A of the terminal 100 can therefore obtain a satisfactory image making it possible to discern the expression of a face when in the foreground, but the low resolution prevents these same details from being distinguished with a wider field of view.

The camera 103 of the terminal 100 has a wide-angle lens and includes an image sensor, for example of the charge-coupled device (CCD) type. The camera 103 is used for videotelephone and for other applications, including photography. Photos taken by the portable terminal 100 can be sent over the network 300 to a computer using a technique that is known in the art. Thus the camera 103 generally has a resolution higher than the resolution of the screen 104. For example, in order to ensure at least a minimum display quality on a computer screen, the resolution of the camera 103 is at least 640×480 pixels.

During a videotelephone call, the framing means 105 extract from each image captured by the camera 103 an image portion whose shape and resolution match the screen 104 of the terminal 200. The shape and resolution are transmitted when the call is initialized. The framing means also include means for oversampling and/or undersampling the image to provide an electronic zoom function using a technique known in the art. Electronic zooming transforms a chosen image portion of any size to adapt it to the size of the screen 204 of the terminal 200 of the party B.

The framing means 105 include an image stabilizer adapted to compensate small amplitude movements of the image that correspond to trembling of the user. The image stabilizer is of a type known in the art and is for example able to detect any overall and uniform motion between two images coming from the camera and effect a translation by a corresponding number of pixels in the opposite direction. Image stabilization is preferably effected before extraction of the image portion.

According to the invention, the framing means 105 also move the image portion as a function of framing information $I_C$ coming from the multiplexing means 113. Framing information $I_C$ received by one of the terminals 100, respectively 200, corresponds to framing data $D_C$ sent by the other terminal 200, respectively 100.

According to the invention, framing is effected by the remote party, who is in a better position to adjust the displayed image. The invention offers intuitive remote control of framing. If the user A of the terminal 100 sees the user B of the terminal 200 leave the screen 104, the most intuitive gesture is to move the screen 104, which user A is already holding in the hand, to track the motion of the user of the terminal 200. Also, if a detail attracts attention and the user wishes to see it closer, it is for the user to move closer to the screen. The proposed intuitive control works by the user moving the terminal in a natural direction to displace the image portion seen on the screen.

Figure 2A:
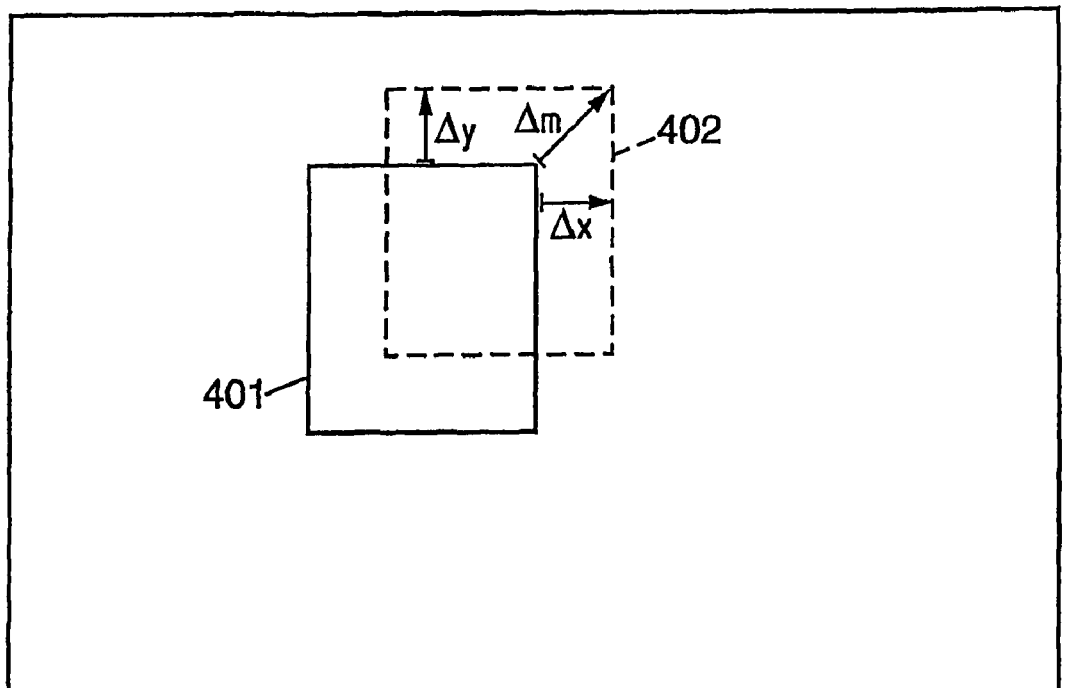
FIG. 2 shows reframing of images in accordance with the invention.

FIG. 2 represents framing modification as a function of movement of the terminal. FIG. 2a shows an image 400 captured by the camera 203 of the terminal 200 and an image portion 401 transmitted and viewed on the screen 104 of the terminal 100. The user of the terminal 100 wishes to move the framing of the image portion 401 to obtain a differently framed image portion 402. The user moves the terminal 100 by a movement Δm in the required direction. That movement Δm can be broken down into a movement Δx along a first axis parallel to a first side of the screen 104 and a movement Δy along a second axis parallel to a second side of the screen 104. The movement is applied in proportion to the position of the frame of the image portion.

Figure 2B:
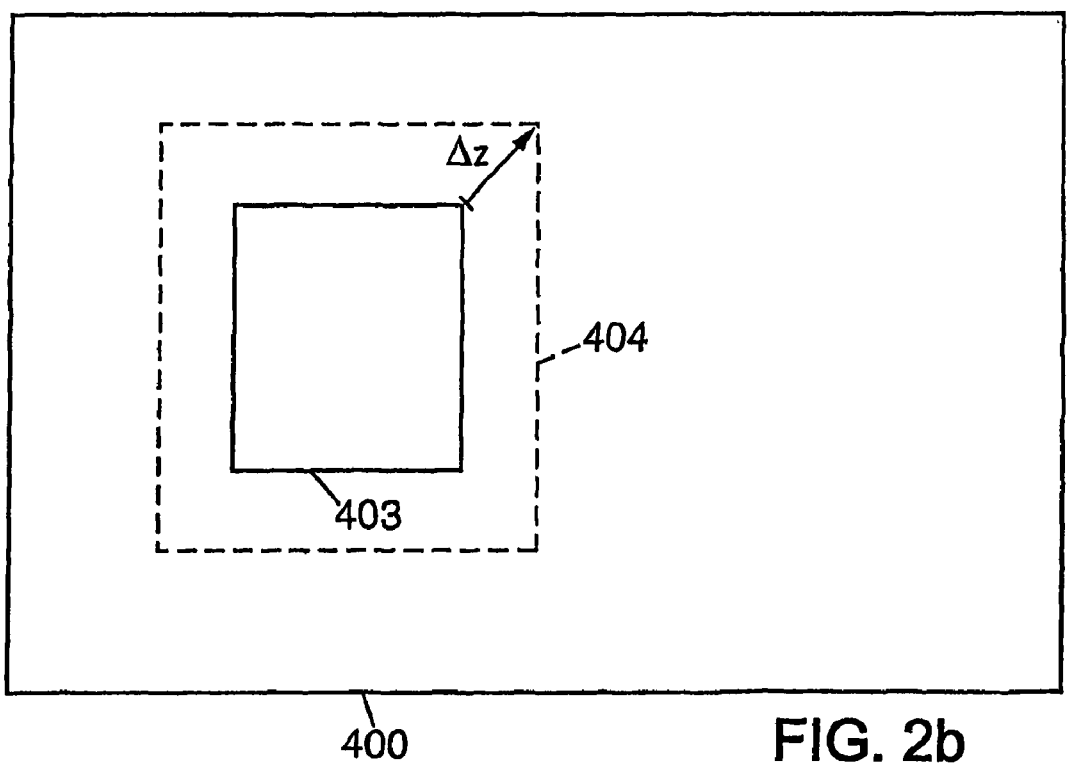

FIG. 2b shows an image 400 captured by the camera 203 of the terminal 200 and a transmitted image portion 403 as seen on the screen 104 of the terminal 100. Wishing to obtain a larger foreground view corresponding to the image portion 404, the user of the terminal 100 moves the terminal so that the screen 104 is farther away, this movement Δz enlarging the frame.

Undersampling then adapts the image portion to the size of the screen 104, which corresponds to "zooming out".

The framing data $D_C$ is produced by the command generator means 112 as a function of motion information coming from the motion sensors 108 to 110 and filtered by the filtering means 111. The motion sensors 108 to 110 consist of accelerometers, gyroscopes and/or electronic magnetometers, for example, able to provide information relating to movement and acceleration in translation and rotation relative to three perpendicular axes. Two of the three axes are preferably parallel to respective sides of the screen 104 with the third axis perpendicular to the screen 104. The translation and rotation are combined to obtain motion information representing relative movement of the screen 104 along one of the three axes for a predetermined time.

The predetermined time corresponds to the sampling time for the motion information Δx, Δy and Δz, for example. The filtering means 111 then filter the motion information Δx, Δy and Δz, which represents an amplitude and a speed of movement. To avoid acting on motion linked to trembling (small movements) or fatigue (slow movements) of the user, only motion information having an absolute value exceeding a minimum threshold $S_m$ is taken into account.

Moreover, the user may move during the videotelephone conversation without wishing to modify the framing. Large movements, i.e. movements having an amplitude whose absolute value is greater than the maximum threshold $S_M$, must be ignored. The filter has the following transfer function for the motion information Δx, Δy and Δz:

$$\Delta uf = \Delta u \text{ if } S_m < |\Delta u| < S_M, \text{ and}$$

$$\Delta uf = 0 \text{ if } |\Delta u| \leq S_m \text{ or if } |\Delta u| \geq S_M,$$

where u replaces x, y or z and Δxf, Δyf and Δzf correspond to the filtered motion information.

The command generation means 112 convert the filtered motion information Δxf, Δyf and Δzf into framing data $D_C$ that can take various forms. Two forms of this data are described below, for example.

A first form of the framing data corresponds to framing commands, which consist of three data items representing a framing modification. The filtered information Δxf and Δyf is quantized to transform the movement into a movement of the frame defining the image portion by a (positive or negative) number of pixels. The filtered information Δzf is quantized to indicate the number of pixels by which the size of the frame defining the image portion increases or decreases. Thereafter the position and the dimensions of the frame of the image portion are managed by the framing means 205 of the other terminal 200.

Figure 3:
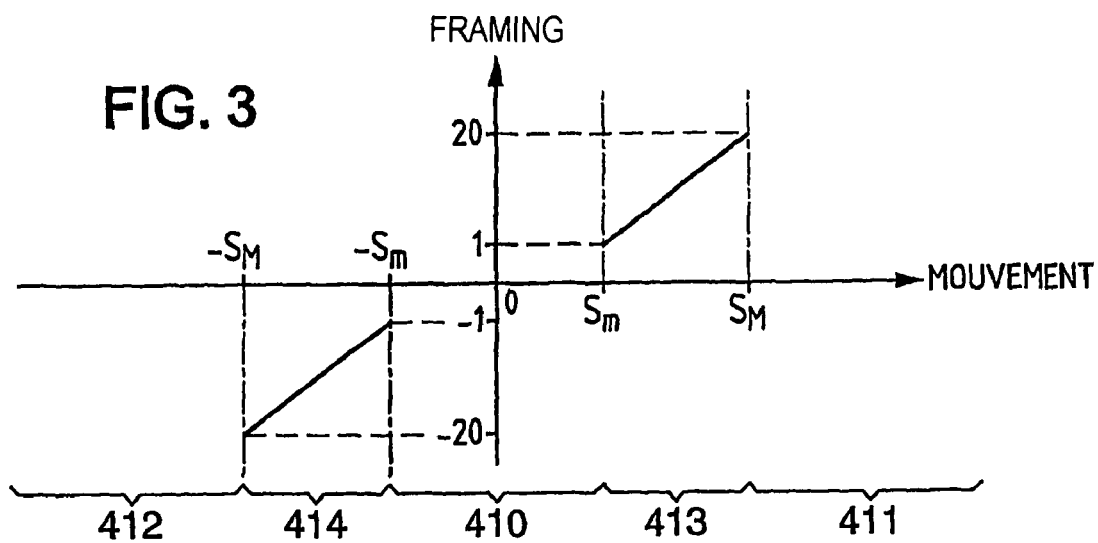
FIG. 3 shows a transfer characteristic for transforming motion information into framing commands.

An example of a transfer characteristic for transformation between motion information and corresponding motion data is represented in FIG. 3. The abscissa axis corresponds to possible values of motion information, for example Δx. Three inoperative areas 410 to 411 correspond to cancellation of the motion information by the filtering means 111. Two quantization areas 413 and 414 correspond to the command for displacing the frame defining the image portion. For example, it is possible to use a displacement by one pixel if the motion information corresponds to the minimum threshold $S_m$ or by 20 pixels if the motion information corresponds to the maximum threshold $S_M$. In a simple embodiment, linear extrapolation is used for movement between the two thresholds S_m and S_M; note that a different curve could be used, however.

A second form of framing data can consist of the position and frame size of a chosen image portion. Under such circumstances, the modifications of the frame are effected by the command generation means 112. The framing means 205 merely select the image portion, possibly accompanied by a zoom effect.

Regardless of the form that the framing data $D_C$ takes, that data is supplied to the multiplexing and communication means 113, which construct data frames to be sent that group together data for the terminal 200. The frame includes audio data and video data relating to the videotelephone call and the framing data D_C. The frame is then packetized with service data intended to identify the frame and its destination. The resulting data packet is converted into a burst that is inserted into a radio signal consisting of a stream of frames going to the network 300, which then routes the various frames to the terminal 200 in the form of a radio signal.

The framing means 105 include an image stabilizer that compensates small movements of the camera. This compensation prevents movements effected to reframe the image of the other party leading in turn to a reciprocal reframing requirement. If the maximum threshold $S_M$ corresponds to a displacement that can be compensated by the image stabilizer, a movement effected to modify the framing of the other terminal 200 is automatically compensated.

If the image stabilizer has insufficient capacity for compensating a movement linked to reframing, the framing means 105 can be connected to the filtering means 111 in order for the displacement of its framing window to take into account the real displacement of the terminal 100. The reframing effected in the terminal 100 is of the same kind as the reframing effected in the other terminal 200 but of different amplitude and sign.

The means described above enable images shot by the camera 103 of the terminal 100 to be reframed from the terminal 200, and vice-versa. Reframing is effected intuitively in response to movement of the terminal 200 that causes the motion sensors 208, 210, the filtering means 211 and the command generation means 212 to produce framing data. Video produced by the terminal 100 during a videotelephone call is therefore controlled by the user B of the terminal 200.

However, such reframing is useful for a dialogue in which the two users are face to face and/or virtually immobile. If one of the users moves a terminal a long way, for example to show something to the other user, reframing becomes superfluous. Moreover, if reframing is effected throughout a long videotelephone conversation in which large movements are effected, the frame delimiting the image portion may find itself at an edge of the image shot by the camera and reframing in one direction may become impossible.

A first improvement uses the framing means 105 of the terminal 100 to reframe the filmed image if the terminal 100 is virtually immobile. The virtual immobility of the terminal 100 can be detected by the image stabilizer, which detects small homogeneous movements of the image. It is equally possible to use the motion sensors 108 to 110 to detect motion of the terminal 100. Thus the terminal can be considered to be virtually immobile if the motion detected is below the maximum threshold $S_M$ for example.

A second improvement is for the framing means 105 to include pattern recognition means adapted to recognize a face. Pattern recognition is effected by means of a technique known in the art for detecting that a face is present in the image, for example. Thus the terminal 100 can establish that user is engaged in a dialogue if a face is detected. If a face is detected, the framing means take account of the framing information. This enables remote control of framing even if the filmed background is moving or the terminal is moving.

Figure 4:
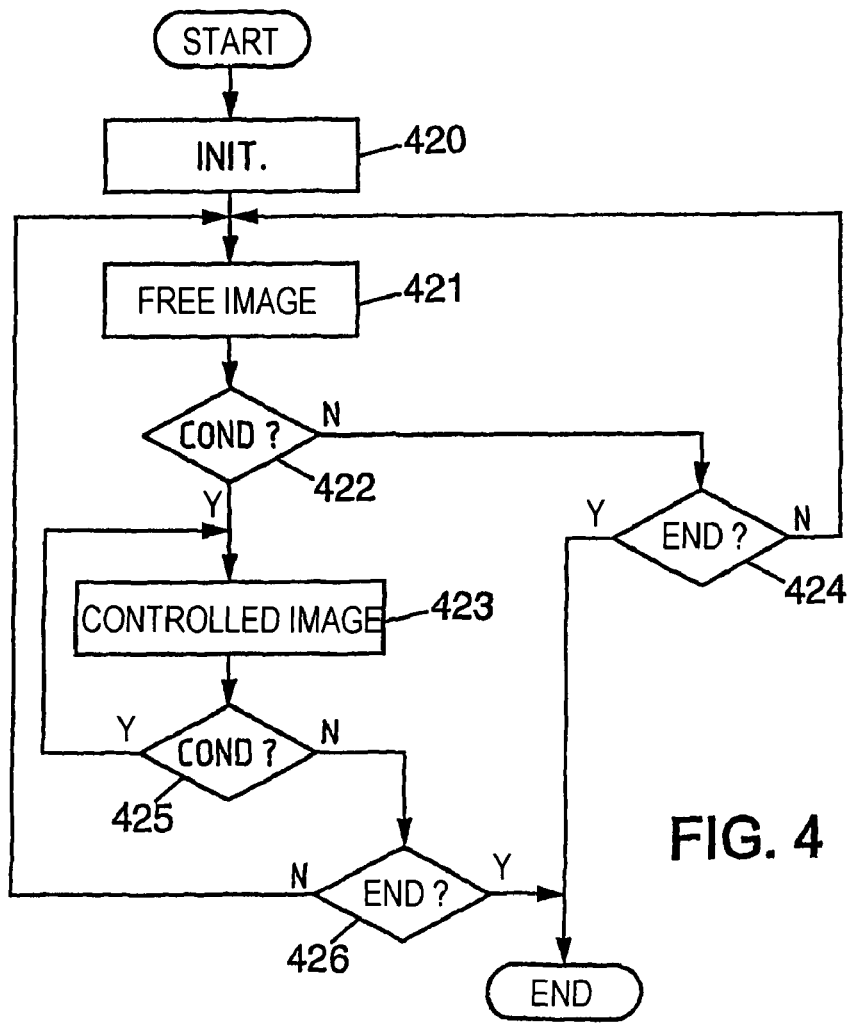
FIG. 4 is a flowchart showing the operation of a terminal effecting image capture in accordance with the invention.

The two improvements are preferably combined. The FIG. 4 flowchart illustrates the implementation of these two improvements in the framing means 105. During a videotelephone call initialization step 420, the framing means 105 receive the characteristics of the screen 204 of the terminal 200 in order to be able to determine the format of the image portion to be sent.

Once the call has been initialized, the framing means 105 function in free image mode (step 421). During this step 421, the framing means select an image portion, for example a center portion, independently of any framing information $I_C$ received.

A test 422 is regularly carried out to detect conditions enabling a change to remote control of the image. The test 422 verifies if the image can be considered immobile or virtually immobile, for example, or if a face is present in the image. If either of these two conditions is satisfied, the next step is the step 423. If neither of the two conditions is satisfied, a test 424 is carried out.

The test 424 checks if the videotelephone call has terminated. If the call has not terminated, the process returns to the step 421 and the framing means function in free image mode.

The step 423 corresponds to the framing means 105 taking account of the framing information $I_C$. The image portion is moved, enlarged or reduced as a function of the framing data received. If necessary, the framing means oversample or undersample the framed image portion to match it to the screen resolution.

A test 425 is regularly carried out to detect conditions enabling a change to remote control of the image. The test 425 verifies if the image can be considered immobile or virtually immobile, for example, or if a face is present in the image. If either of the two conditions is satisfied, the process returns to the step 423. If neither of the two conditions is satisfied, a test 426 is carried out.

The test 426 checks if the videotelephone call has terminated. If the call has not terminated, the image portion is re-initialized, the process returns to the step 421, and the framing means operate in free image mode.

The invention described can be implemented in various ways. In the example described, the terminals 100 and 200 are identical and both can send framing information and receive and take account of framing information. The person skilled in the art will nevertheless understand that a terminal could produce and send framing data without receiving framing data. Conversely, a terminal could take framing information into account without generating framing data itself. Terminals implementing the invention can therefore be limited to the means necessary for the use made of the invention without reproducing all of the means included in the examples described.

The invention claimed is:

1. A mobile videotelephone terminal including:
   a communication interface for communicating with another videotelephone terminal via a radio communication network;
   motion sensors for producing information representing motion of the mobile videotelephone terminal; and
   a formatting unit for converting the motion information into outgoing framing data sent to the other videotelephone terminal;
   the communication interface being adapted to insert the outgoing framing data into data to be sent to the other videotelephone terminal over the radio communication network, wherein the formatting unit is adapted to compare the motion information to a minimum motion threshold and a maximum motion threshold, and wherein the outgoing framing data is produced in response to detection of motion between the minimum motion threshold and the maximum motion threshold.

2. The mobile videotelephone terminal of claim 1, further including a display for displaying an image captured by a camera of the other videotelephone terminal, the framing data being adapted to control framing of the image captured by said camera.

3. The mobile videotelephone terminal of to claim 1, wherein the motion sensors include gyroscopes and/or accelerometers and/or magnetometers.

4. The mobile videotelephone terminal of claim 1, further including:
   a camera for capturing images having a first size;
   a framing unit for extracting an image portion having a second size smaller than the first size from an image captured by the camera, the framing unit selecting the image portion as a function of remote framing information coming from the other terminal; and
   a video encoder for converting a stream of image portions coming from the framing unit into outgoing video data;
   the communication interface being adapted to extract the remote framing information from data received from the other videotelephone terminal via the radio communication network.

5. A mobile videotelephone terminal including:
- a communication interface for communicating with another videotelephone terminal via a radio communication network;
- a camera for capturing images having a first size;
- a framing unit for extracting an image portion having a second size smaller than the first size from an image captured by the camera, the framing unit selecting the image portion as a function of remote framing information coming from the other videotelephone terminal; and
- a video encoder for converting a stream of image portions coming from the framing unit into outgoing video data;

the communication interface being adapted to extract the remote framing information from data received from the other videotelephone terminal via the radio communication network.

6. The mobile videotelephone terminal of claim 5, wherein the framing unit is adapted to take the remote framing information into account if the captured image is considered immobile or virtually immobile.

7. The mobile videotelephone terminal of claim 5, wherein the framing unit includes a pattern recognition module adapted to recognize a face and wherein the framing unit is adapted to take the remote framing information into account if a face is detected.

8. A method of reframing during a videotelephone call an image captured by a camera of a first mobile videotelephone terminal with the aid of a second mobile videotelephone terminal including a screen and motion sensors, the method including:
- producing framing data in response to motion of the second mobile videotelephone terminal on the basis of motion information coming from the motion sensors; and
- sending said framing data to the first mobile videotelephone terminal, wherein the second mobile videotelephone terminal produces the framing data if the motion information is above a minimum motion threshold and below a maximum motion threshold.

9. A method according to claim 8, further comprising, in response to framing information received by the first mobile videotelephone terminal and corresponding to framing data sent by the second mobile videotelephone terminal:
- extracting, by the first mobile videotelephone terminal, image portions corresponding to said framing information from images captured by the camera of the first mobile videotelephone terminal; and
- producing a video clip representing a succession of image portions by the first mobile videotelephone terminal.

10. A method according to claim 9, wherein the framing information is taken into account if the image captured by the camera of the first mobile videotelephone terminal moves only slightly or if a face is detected in the image.

11. A system for reframing an image captured by a camera of a first mobile videotelephone terminal with the aid of a second mobile videotelephone terminal including a screen and motion sensors;
- the system including said first mobile videotelephone terminal and said second mobile videotelephone terminal, which are adapted to communicate with each other via a videotelephone network, the first mobile videotelephone terminal transmitting to the second mobile videotelephone terminal images captured during the videotelephone call; and
- the system being adapted to produce framing data for framing an image captured by the first mobile videotelephone terminal in response to motion of the second mobile videotelephone terminal on the basis of motion information coming from the motion sensors of the second mobile videotelephone terminal, wherein the second mobile videotelephone terminal has a formatting unit adapted to compare the motion information to a minimum motion threshold and a maximum motion threshold, and wherein the framing data is produced in response to detection of motion between the minimum motion threshold and the maximum motion threshold.

* * * * *